(12) United States Patent
Yamamoto

(10) Patent No.: US 7,778,548 B2
(45) Date of Patent: Aug. 17, 2010

(54) OPTICAL COMMUNICATION SYSTEM, LIGHTING EQUIPMENT AND TERMINAL EQUIPMENT USED THEREIN

(75) Inventor: Kenji Yamamoto, Sagamihara (JP)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 895 days.

(21) Appl. No.: 11/479,837

(22) Filed: Jun. 30, 2006

(65) Prior Publication Data

US 2007/0008258 A1 Jan. 11, 2007

(30) Foreign Application Priority Data

Jul. 5, 2005 (JP) .............................. 2005-195990

(51) Int. Cl.
*H04J 14/00* (2006.01)

(52) U.S. Cl. .................... 398/78; 398/172; 398/127; 398/128; 398/130; 398/135; 372/26; 372/27; 372/28; 385/14

(58) Field of Classification Search ................. 398/129, 398/131, 128, 130, 137, 50, 68, 159, 79, 398/83, 78, 127, 135, 136, 172, 117, 119, 398/182, 183, 186, 189, 190, 193, 202, 208, 398/209, 164, 158; 372/26, 27, 28; 385/14
See application file for complete search history.

(56) References Cited

U.S. PATENT DOCUMENTS

| | | | | |
|---|---|---|---|---|
| 6,542,270 B2* | 4/2003 | Perkins et al. | .............. | 398/140 |
| 6,885,826 B2* | 4/2005 | Kropp | .......................... | 398/182 |
| 6,925,261 B2* | 8/2005 | Haruyama | .................. | 398/129 |
| 7,277,644 B2* | 10/2007 | Johnson et al. | ............. | 398/158 |
| 7,389,051 B2* | 6/2008 | Morioka et al. | ............. | 398/127 |
| 7,447,442 B2* | 11/2008 | Oda et al. | ................... | 398/172 |
| 2002/0027684 A1* | 3/2002 | Ait Sab et al. | .............. | 359/124 |
| 2002/0145787 A1 | 10/2002 | Shpantzer et al. | | |
| 2002/0167701 A1 | 11/2002 | Hirata | | |
| 2004/0081471 A1* | 4/2004 | Lee | ............................. | 398/193 |

FOREIGN PATENT DOCUMENTS

| | | |
|---|---|---|
| JP | 1122220 | 5/1989 |
| JP | 2004/147063 | 5/2004 |
| JP | 2004-147603 | 5/2004 |
| JP | 2004/297425 | 10/2004 |
| WO | WO 02/47292 | 6/2002 |

OTHER PUBLICATIONS

Search Report from corresponding application No. GB 0613206.2 dated Oct. 24, 2006.
Hara, Go et al., "A Study on Indoor Visible Light Communication System Using CDMA", *Div. of Elec. and Comp. Eng., Yokohama National University*, (2002),278.

* cited by examiner

*Primary Examiner*—Hanh Phan

(57) ABSTRACT

A communication system has lighting equipment that has transmitter comprising multiple light-emitting elements that each emit light of different wavelengths and terminal equipment that has light-receiver comprising multiple light-receiving elements that receive optical signals for each of the different wavelengths.

8 Claims, 4 Drawing Sheets

OPTICAL COMMUNICATION SYSTEM, LIGHTING EQUIPMENT AND TERMINAL EQUIPMENT USED THEREIN

FIELD OF THE INVENTION

The present invention relates to an optical communication system that uses primarily visible light, particularly an optical communication system that uses lighting equipment as the light source.

DISCUSSION OF THE BACKGROUND ART

Lighting equipment that uses light-emitting diodes has been put to practical use in recent years. When light-emitting diodes are used as the light source for the purpose of lighting, a combination of light-emitting diodes that emit light of multiple different colors (usually red (R), green (G), and blue (B)) is generally used because it is easy to control color tone, color reproducibility is excellent, etc. White lighting with good color rendering properties is obtained by mixing light of these different wavelengths.

On the other hand, optical communication using this type of lighting equipment has been attempted (refer to JP Unexamined Patent Application (Kokai) 2004-147,063). By means of this system, the lighting equipment that is used for indoor lighting comprises multiple light-emitting diodes. The multiple light-emitting diodes usually emit light of different colors to provide light for lighting that is a mixture of the colors of emitted light while at the same time provide signal light that has been modulated by a predetermined formula. Terminals disposed under the illuminated environment receive this light and extract the modulated information signals.

It is necessary to maintain the component of each emission color at the appropriate ratio in order to maintain white light for lighting that has sufficient color rendering properties. Consequently, a modulation of the light for lighting should be conducted while minimizing the effect on human vision. Moreover, it is also necessary to guarantee sufficient illumination for lighting when the light source is used for the purpose of lighting.

Nevertheless, by means of conventional modulation forms, it is difficult to maintain color rendering properties or color temperature with this type of system and perform high-speed base band signal transmission at the same time. That is, when large volumes of information are subjected to signal transmission by conventional intensity modulation, there is an effect on the illumination of the lighting, or the shade of the color of the mixed light. Therefore, an object of the present invention is to provide a communication system that uses light for lighting, as well as lighting equipment and terminal equipment used in the same, with which high-speed signal transmission is possible.

The present invention provides a novel optical communication system and lighting equipment used therein in order to solve the above-mentioned problems. Code division multiple access communication is performed by this optical communication system and lighting equipment.

SUMMARY OF THE INVENTION

The optical communication system of the present invention comprises lighting equipment that has transmitter comprising multiple light-emitting elements that each emit light of different wavelengths and that provides light for lighting by means of a combination of light of two or more of the different wavelengths. The light from the lighting equipment is received by light-receiving means in the terminal equipment. The light-receiving means comprises multiple light-receiving elements that each receive optical signals from the transmitter for each corresponding wavelength. The transmitter divide a series of input signals into multiple signals corresponding to light of the different wavelengths; feed each of the multiple signals to the multiple light-emitting elements; and perform code division multiple access communication through modulation of emission intensity between the multiple light-emitting elements and the multiple light-receiving elements in the light-receiver. The light-receiver of the terminal equipment produces output signals from the reception signals of the multiple light-receiving elements. The multiple light-emitting elements can be composed of light-emitting diode elements, and the multiple light-receiving elements can be composed of photodetectors.

Preferably, the transmitter and the receiver can be designed so that a subscription time is set for communication. Moreover, the terminal equipment can further comprise transmitter capable of transmitting signals to the lighting equipment, and the lighting equipment can further comprise receiver capable of receiving signals from the terminal equipment.

The lighting equipment of the present invention has transmitter that comprises multiple light-emitting elements that each emit light of different wavelengths, and provides light for lighting by means of a combination of light of two or more different wavelengths. The transmitter is designed such that communication is performed with receiver of the terminal equipment that has receiver comprising multiple light-receiving elements for receiving optical signals from this transmitter for each of the corresponding wavelengths. Communication between the transmitter and the receiver is code division multiple access by modulation of emission intensity. The multiple light-emitting elements can be composed of light-emitting diode elements.

Preferably, the modulation means comprises a scrambler for sorting in order to divide the input signals, and spread-spectrum signal generation means for feeding the spread code for modulating the signal intensity of each wavelength and thereby making possible communication by code division multiple access. There can be three or more multiple light-emitting elements in the lighting equipment, and the light for lighting can be white light or warm light produced by mixing of colors.

The terminal equipment for optical communication of the present invention has receiver comprising multiple light-receiving elements that receive, for each corresponding wavelength, optical signals from the light transmitted from the transmitter of the lighting equipment that has transmitter comprising multiple light-emitting elements that each emit light of different wavelengths and that provides light for lighting by means of a combination of light of two or more different wavelengths. The light-receiver comprises signal demodulation means for demodulation of modulated signals such that code division multiple access is performed by modulation of emission intensity between the receiver and the transmitter of the lighting equipment. The light-receiver may also have multiple photodiodes.

The present invention provides an optical communication system that has a lighting function and is capable of high-speed signal transmission, as well as lighting equipment and terminal equipment. In particular, pseudo-noise signals are used for the spread signals; therefore, it is possible to retain white light for lighting without any great change in color temperature by high-speed modulation. That is, signal redundancy is increased and reliable communication is made possible by reducing the bit width of the signals or increasing the number of wavelengths that are differentiated.

The present invention makes multiple communications possible through the use of code domains. Even if communications by means of unrelated single wavelengths are simultaneously performed, it is possible to increase communication efficiency, regardless of the presence of interference, by optimizing the upper layer protocol. It should be noted that, when necessary, measures can be taken that include error correction and application of a time lag for modulation between broadcast data and spread codes.

The present invention does not require electrical filters or a complex system for frequency conversion and similar measures; therefore, the present invention can be inexpensively created.

DETAILED DESCRIPTION OF THE PREFERRED EMBODIMENT

Preferred embodiments of the optical communication system, lighting equipment, and terminal equipment of the present invention will now be described below while referring to the attached drawings.

Figure 1:
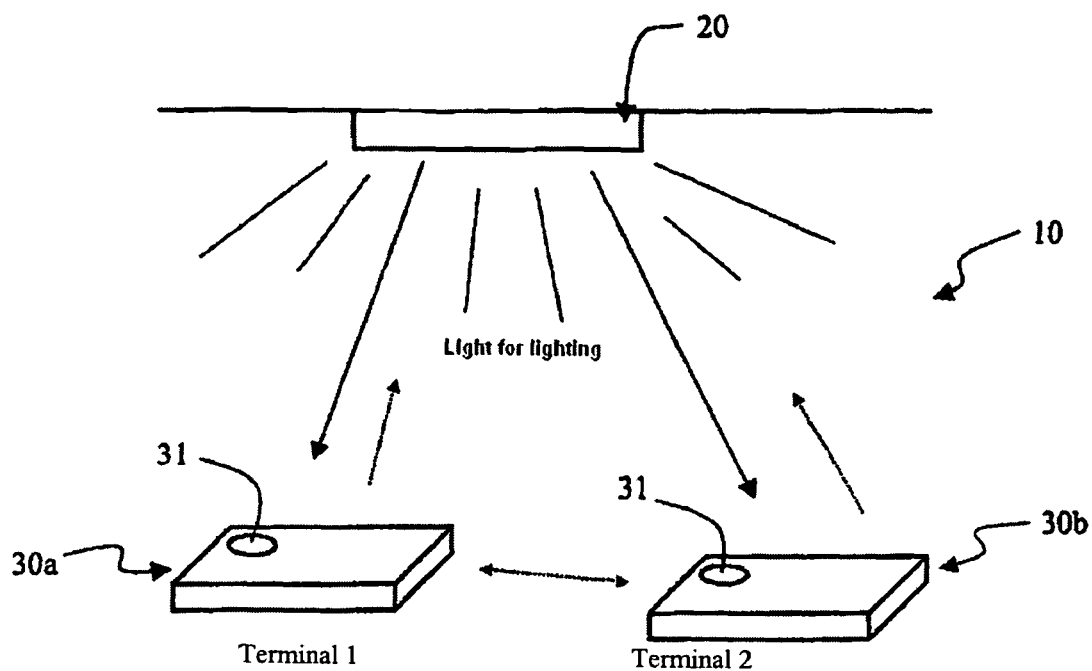
FIG. 1 is a drawing that explains the structure of the optical communication system of the present invention.

FIG. 1 is a drawing explaining the general structure of the optical communication system of the present invention. As shown in FIG. 1, a system 10 has lighting equipment 20 and terminals 30a and 30b used under a lighted environment. Terminals 30a and 30b have receiver 31 comprising light-receiving elements. As will be described below, the light for the lighting of lighting equipment 20 contains modulated signals. The terminals extract the signals using light-receiver 31. Signals are transmitted in one direction from lighting equipment 20 to terminal 30 when communication is accomplished using light for lighting as shown in FIG. 1. However, as will be mentioned later, the system can also be designed so that there are additional means capable of communication with one terminal 30 itself or from terminal 30 to lighting equipment 20 using visible light or infrared light.

Figure 2:
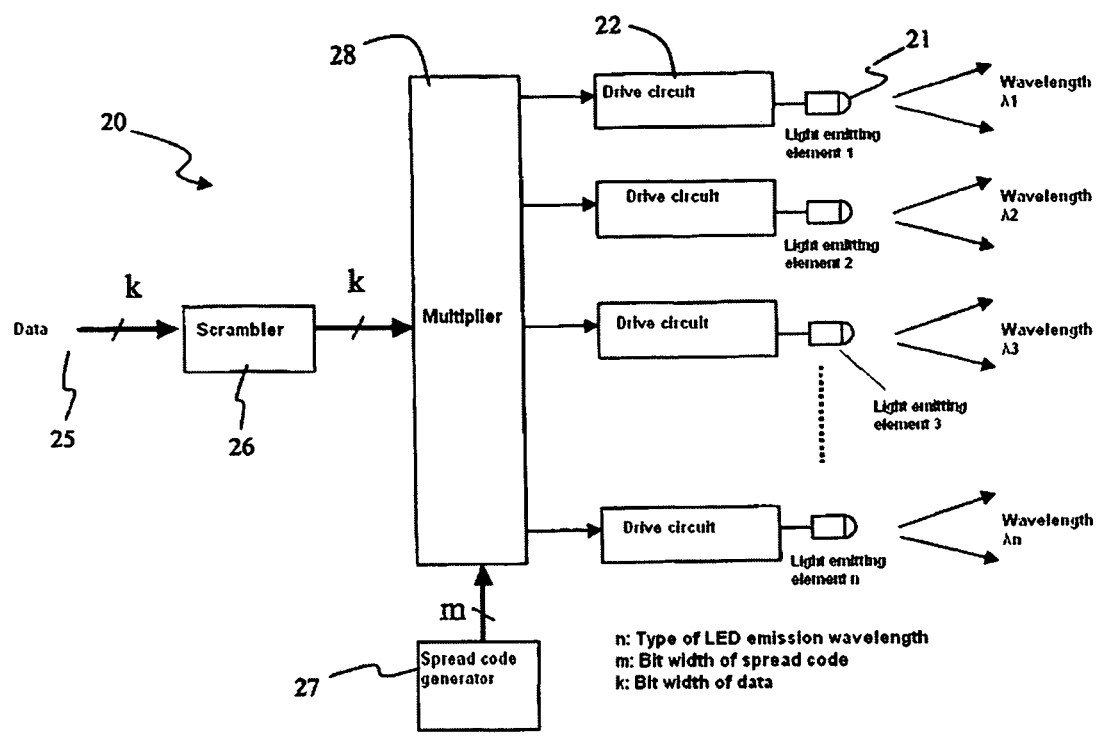
FIG. 2 is a sketch explaining the structure of the lighting equipment of the present invention.

FIG. 2 is a rough sketch showing the structure of the lighting equipment of the present invention. Lighting equipment 20 comprises multiple light-emitting elements 21 with a drive circuit 22 for each element. Light-emitting elements 21 are semiconductor elements and are typically composed of light-emitting diodes. These multiple light-emitting diodes 21 emit light of different wavelengths ($\lambda 1$, $\lambda 2$, etc.). Drive circuits 22 provide a predetermined amount of electricity to each light-emitting element 21.

Lighting equipment 20 can emit light by means of light-emitting elements 21 in such a way that it overlaps the light for lighting and the light containing information signals. The information signals are introduced by a code division multiplexing system. Lighting equipment 20 has input data 25, a scrambler 26, a spread-spectrum signal generator 27, and a multiplier 28.

The number of bits in the data is represented by k in the figure, and the number of bits in the spread signals is represented by m. That is, by means of the present embodiment, data of k bits for broadcast from lighting system 20 are input to scrambler 26 (for instance, a 4B5D circuit). The DC component of the signals is eliminated at this time. The signals are multiplied by a spread code of m bits from spread signal generator 27. The output from multiplier 28 is fed to drive circuits 22. Drive circuits 22 supply the drive current necessary for lighting and signal transmission to light-emitting elements 21 via signals from multiplier 28. It should be noted that m is preferably selected from numbers greater than k. Moreover, the number of light-emitting elements n is equal to m.

Figure 3:
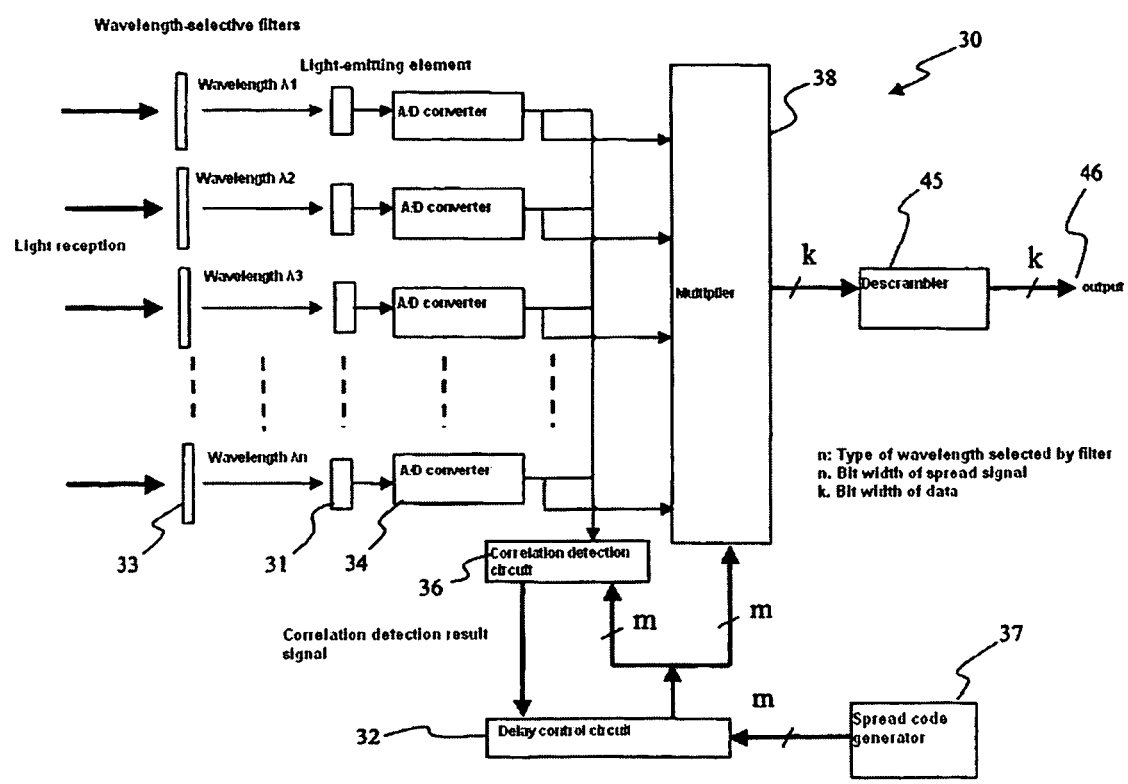
FIG. 3 is a sketch explaining the structure of the receiver at the terminal of the present invention.

FIG. 3 is a rough sketch that describes the structure of the light-receiver in the terminals of the present invention. Terminal 20 comprises multiple light-receiving elements joined to filters 33 and A/D converters 34 connected to light-receiving elements 31. The output from A/D converters 34 is input to a correlation testing circuit 36 and a multiplier 38. Filters 33 corresponding to multiple light-receiving elements 31 are such that they are capable of transmitting different wavelengths and as a result, each of light-receiving elements 31 receives light of a different wavelength or color.

Terminal 30 has a control delay circuit 32 connected to a spread signal generator 37. Spread signal generator 37 generates the same spread code row as the spread code row used for signal broadcast by lighting equipment 20. The spread code of m bits from control delay circuit 32 is fed to correlation testing circuit 36 and multiplier 38. Correlation testing result signals CS from correlation testing circuit 36 are supplied to control delay circuit 32. Control delay circuit 32 that has received correlation testing result signals CS feeds the necessary delay to the generated spread signals based on these correlation testing result signals.

Multiplier 38 processes signals by multiplying the output from each light-receiving element 31 and the spread code. The output of k bits from multiplier 38 is input to a descrambler 45 and descrambled. As a result, data broadcast from lighting equipment 20 are regenerated and output to an output 46.

Figure 4:
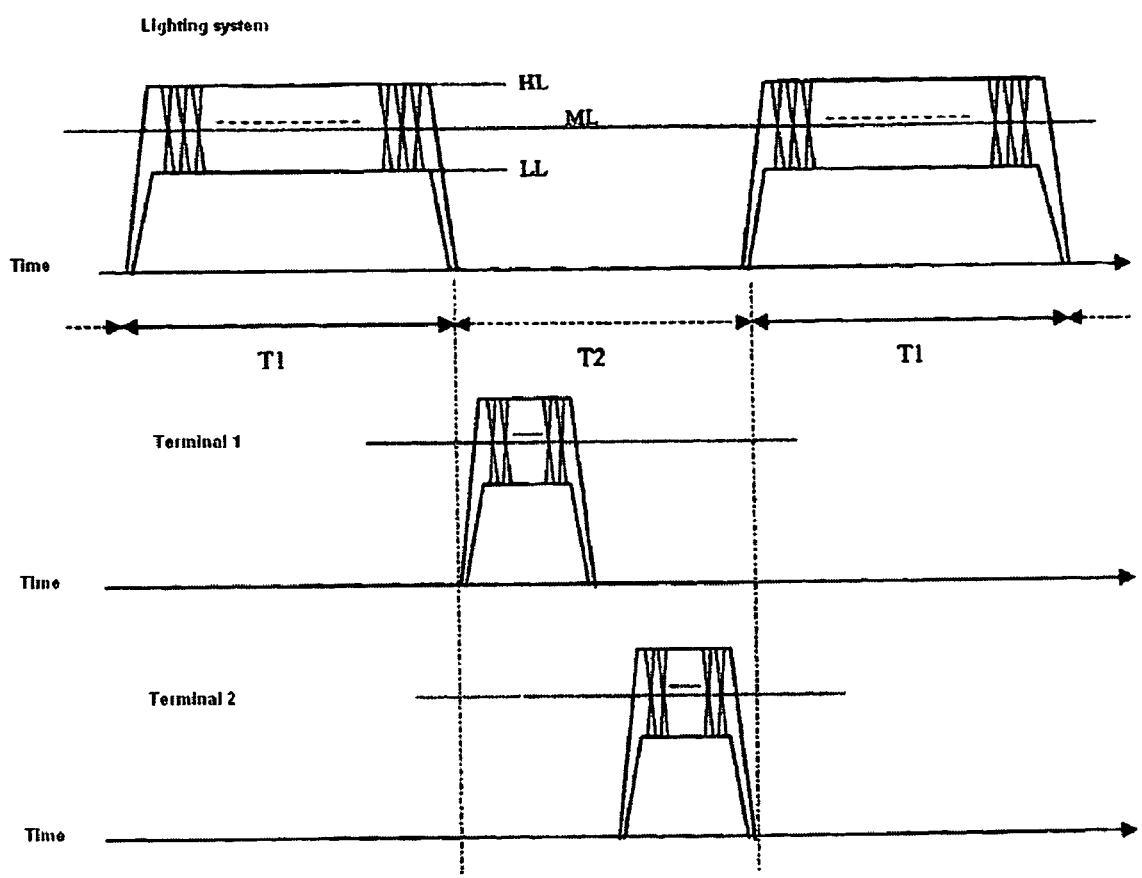
FIG. 4 is a time chart that describes an example of signal transmission when there is a subscription time.

Communication by the above-mentioned system can have a subscription time in order to enable, for instance, two-way communication. FIG. 4 is a time chart of an example of signal transmission when there is a subscription time. The light-emitting state of one of the light-emitting elements of lighting system 20 matches the subscription time. The lighting of the other light-emitting elements in the same lighting equipment 20 can be synchronized.

Time zone T1 in the figure is used for lighting and signal transmission. That is, signals are transmitted from the lighting equipment to each terminal. Then, time T2 is the subscription time when communication by optical signals is possible between the terminals or from the terminals to the lighting equipment. HL in FIG. 1 shows high-level emission intensity, LL shows low-level emission intensity, and ML shows median emission intensity. That is, light is not emitted for lighting during the subscription time. The subscription time must be set at a time width such that the function of the lighting equipment for lighting can be sufficiently guaranteed (for instance, a time width of from 2 to 5% of a cycle).

An example with two terminals is shown in FIG. 4. Terminal 1 emits light at time zone T1 during subscription time T2. For instance, terminal 1 can transmit signals to terminal 2, or a light-receiver can be disposed at the lighting equipment and signals can be transmitted from the terminal to the lighting equipment. This communication can be performed independently of lighting; therefore, it is not necessary to use white light, and it is possible to use infrared rays, and other wavelengths in place of visible light.

Once signal output from the terminal 1 has been completed within subscription time T2, signals can be transmitted within time zone T2 from terminal 2 that has detected [the completion of signal output from terminal 1]. As with signal transmission from terminal 1, signals can be transmitted from terminal 2 to terminal 1, or signals can be transmitted from terminal 2 to the lighting system. The time after subscription time T2 is over is regarded as time T1 for re-lighting, light emission from light-emitting device is turned on, and signal transmission from the lighting equipment is restarted.

Preferred embodiments of the present invention have been described in detail. However, it goes without saying that these are examples and that the present invention is not limited to these examples. For instance, the time-division multiplexing described in above-mentioned FIG. 4 can be a more complicated system wherein the number of terminals is increased to three or more, etc.

What is claimed is:

1. An optical communication system which comprises lighting equipment and terminal equipment, the lighting equipment having a transmitter comprising a plurality of light-emitting elements, each light-emitting element of the plurality of light-emitting elements having a corresponding wavelength different from a wavelength of all other light-emitting elements of the plurality of light-emitting elements, the transmitter providing substantially white-light illumination of an ambient environment by a combination of light of a plurality of different wavelengths emitted by a plurality of corresponding light-emitting elements, the terminal equipment comprising a plurality of terminals, each terminal having a receiver comprising a plurality of light-receiving elements that receive optical signals wirelessly via the ambient environment from the transmitter for each of the corresponding wavelengths, wherein the transmitter divides a series of input signals into a plurality of signals corresponding to light of the different wavelengths, feeds each of the plurality of signals to the corresponding plurality of light-emitting elements, and performs code-division multiple access communication with each of the plurality of terminals by modulation of emission intensity between the plurality of light-emitting elements and the plurality of light-receiving elements in the receiver, the code-division multiple access communication using a spread code to spread the input signals over the different wavelengths that in combination define the substantially white-light illumination, and the receiver of each terminal generates output signals from reception signals of the plurality of light-receiving elements by de-spreading the reception signals using the spread code.

2. The optical communication system according to claim 1, wherein said plurality of light-emitting elements comprise light-emitting diode elements, and the multiple light-receiving elements comprise photodetectors.

3. The optical communication system according to claim 1, wherein it is possible to set a subscription time for communication between the transmitter and the receiver.

4. The optical communication system according to claim 1, wherein said terminal equipment is capable of transmitting signals to the lighting equipment, and the lighting equipment also comprises a receiver capable of receiving signals from the terminal equipment.

5. Lighting equipment having a transmitter comprising a plurality of light-emitting elements, each light-emitting element of the plurality of light-emitting elements having a corresponding wavelength different from a wavelength of all other light-emitting elements of the plurality of light-emitting elements, the transmitter providing substantially white-light illumination of an ambient environment by a combination of light of a plurality of different wavelengths emitted by a plurality of corresponding light-emitting elements, wherein said transmitter also comprises a signal modulator for modulation such that there is code-division multiple access communication of input signals by means of modulation of emission intensity between the transmitter and a receiver comprising a plurality of light-receiving elements that receive optical signals wirelessly via the ambient environment from the transmitter for each of the corresponding wavelengths, the code-division multiple access communication using a spread code to spread the input signals over the different wavelengths that in combination define the substantially white-light illumination.

6. The lighting system according to claim 5, wherein said modulator comprises a scrambler that performs sorting for dividing the input signals, and spread signal generator for feeding the spread code for modulating the signal intensity of each wavelength and thereby making possible communication by code division multiple access.

7. The lighting system according to claim 5, wherein said plurality of light-emitting elements comprises light-emitting diode elements.

8. The lighting system according to claim 5, wherein said plurality of light-emitting elements comprises three or more light-emitting elements that produce white or warm color lighting by color mixing.

* * * * *